United States Patent [19]
Hall et al.

[11] Patent Number: 5,882,817
[45] Date of Patent: Mar. 16, 1999

[54] BATTERY CELL DESIGN FOR A BIPOLAR RECHARGEABLE BATTERY

[75] Inventors: John C. Hall, Saratoga; Bruce Inenaga, Sunnyvale, both of Calif.

[73] Assignee: Space Systems/Loral, Inc., Palo Alto, Calif.

[21] Appl. No.: 808,009

[22] Filed: Mar. 3, 1997

[51] Int. Cl.⁶ ............................... H01M 6/46; H01M 6/48
[52] U.S. Cl. ......................... 429/155; 429/157; 429/158; 429/167; 429/210
[58] Field of Search ................................. 429/155, 157, 429/158, 167, 210

[56] References Cited

U.S. PATENT DOCUMENTS

| | | | |
|---|---|---|---|
| 5,395,706 | 3/1995 | Hall | 429/50 |
| 5,395,708 | 3/1995 | Hall | 429/120 |
| 5,652,073 | 7/1997 | Lenhart et al. | 429/210 |

*Primary Examiner*—Maria Nuzzolillo
*Assistant Examiner*—Laura Weiner
*Attorney, Agent, or Firm*—Perman & Green, LLP

[57] ABSTRACT

Plastic hydrophobic material is bonded to a metallic sheet member such that the resulting sandwich structure is impervious to electrochemical delamination. First and second films of the plastic hydrophobic material are applied to opposed surfaces of the metallic sheet member and extend beyond a peripheral edge of the metallic sheet member to form contiguous border portions. A plurality of perforations are formed through the metallic sheet member at locations spaced from its peripheral edge. A resulting sandwich structure of the metallic sheet member and the first and second films are compressed and simultaneously the temperature is raised to the sintering temperature of the hydrophobic film material. The first and second films are caused to melt sufficiently at their interfaces to cause an intermixing of the juxtaposed material thereof throughout the region of the border portions and throughout the regions of the perforations. When the resulting sandwich structure is cooled to room temperature and the films return to the hardened state, they are firmly bonded together in the region of the border to form an integral fringe which seals the peripheral edge of the metallic sheet member from ambient conditions and throughout the regions of the perforations such that the first and second films, respectively, are drawn firmly into engagement with the metallic sheet member by reason of the differential coefficient of thermal expansion between the metallic sheet member and the hydrophobic film material.

9 Claims, 4 Drawing Sheets

FIG. 6
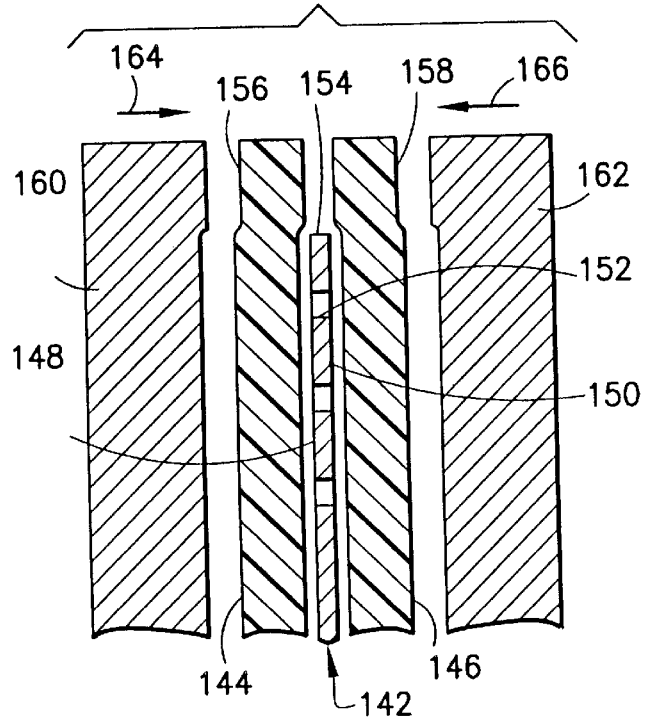
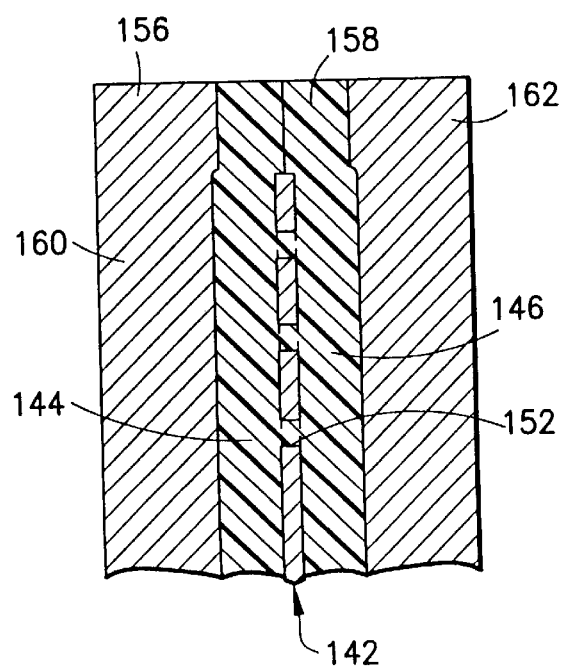
FIG. 7
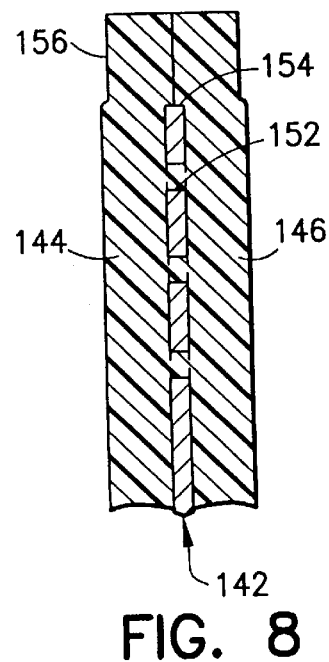
FIG. 8

BATTERY CELL DESIGN FOR A BIPOLAR RECHARGEABLE BATTERY

BACKGROUND OF THE INVENTION

1. Field of the Invention

The present invention relates to a method for bonding a plastic hydrophobic film to a metallic sheet member and to an article so produced. The invention may be of particular benefit for a bipolar cell for gas depolarized rechargeable batteries such as nickel hydrogen and zinc oxygen.

2. Discussion of the Prior Art

Bipolar batteries require a conductive planar layer between series connected cells which essentially replaces external bus bars employed in monopolar batteries. Bipolar batteries also require a means for restricting electrolyte communication between series connected cells as this completes an intrinsic short circuit when combined with the bipolar plate. In the case of nickel hydrogen batteries as taught in U.S. application for Patent, Ser. No. 08/626,992 filed Apr. 3, 1996, entitled, "Bipolar Cell Design for a Gas Depolarized Battery", this restriction is accomplished by applying an inert hydrophobic electrically insulating layer to the periphery of the bipolar plate to contain liquid electrolyte solution within the confines of the individual cell. A preferred material for this purpose, is polytetrafluoroethylene, for example, available under the trademark Teflon®, manufactured by E.I. duPont de Nemours Company of Wilmington, Del.

The hydrophobic film must be bonded to the metal in order to prevent electrolyte from creeping under the layer and thereby bridging to the next series cell. The bonding between the Teflon® material and the bipolar plate must be stable in the cell environment as an unstable bond will eventually delaminate leading to an intercell electrolyte solution bridge. In practice, traditional Teflon® coating processes such as those with carbon and chromic oxide primers have not been found to be stable in the cell environment. Chemically applied coatings typically fail due to attack on the bonding interface between the Teflon® material and the metallic bipolar plate in the cell electrochemical environment.

SUMMARY OF THE INVENTION

It was in light of the foregoing that the present invention was conceived and is now hereby reduced to practice. According to the invention, plastic hydrophobic material is bonded to a metallic sheet member such that the resulting sandwich structure is impervious to electrochemical delamination. First and second films of the plastic hydrophobic material are applied to opposed surfaces of the metallic sheet member and extend beyond a peripheral edge of the metallic sheet member to form contiguous border portions. A plurality of perforations are formed through the metallic sheet member at locations spaced from its peripheral edge. A resulting sandwich structure of the metallic sheet member and the first and second films are compressed and simultaneously the temperature is raised to the sintering temperature of the hydrophobic film material. The first and second films are caused to melt sufficiently at their interfaces to cause an intermixing of the juxtaposed material thereof throughout the region of the border portions and throughout the regions of the perforations. When the resulting sandwich structure is cooled to room temperature and the films return to the hardened state, they are firmly bonded together in the region of the border to form an integral fringe which seals the peripheral edge of the metallic sheet member from ambient conditions and throughout the regions of the perforations such that the first and second films, respectively, are drawn firmly into engagement with the metallic sheet member by reason of the differential coefficient of thermal expansion between the metallic sheet member and the hydrophobic film material.

The difficulties noted earlier have led the applicants to conceive of the approach of the invention. In this approach, films of the plastic hydrophobic material, Teflon®, for example, on opposite sides of a conductive bipolar plate, nickel, for example, are thermally welded to each other through perforations at the edge of the bipolar plate. In effect, the films are riveted to the bipolar plate. The welding is carried out by compressing a sandwich of the two films and the bipolar plate in a heating press and raising the temperature to the sintering point of the film material (typically less than approximately 400° C.) which must be less then the melting point of the bipolar plate (for example, 1455° C. for nickel).

In a preferred embodiment of this approach, the films are truncated conical surfaces which are bonded to the inner and outer perforated conical surface of the metallic bipolar dish as taught in the aforementioned U.S. application Ser. No. 08/626,992. In this instance, the differential coefficient of thermal expansion of the Teflon® material causes the outer layer to compress against the metallic surface. The inner Teflon® layer is prevented from pulling away from the metallic dish by the numerous rivet points through the dish to the outer Teflon® layer.

Accordingly, it is a primary object of the invention to provide an article in which inert plastic hydrophobic film material is bonded to a metallic sheet member such that the resulting sandwich structure is impervious to electrochemical delamination and a method for producing such an article.

Another object of the invention is to provide a method of bonding a plastic hydrophobic film material to a metallic sheet member having a plurality of perforations at locations spaced from its peripheral edge, according to which first and second films are applied to opposed surfaces and extend beyond a peripheral edge thereof to form contiguous border portions, then compressing and simultaneously heating the resulting sandwich structure to the sintering temperature of the film material whereby the films are caused to melt sufficiently at their interfaces to cause an intermixing of the juxtaposed material thereof throughout the region of the border portions and throughout the regions of the perforations such that when the resulting sandwich structure is cooled to room temperature and the films return to the hardened state, they are firmly bonded together in the region of the border to form an integral fringe which seals the peripheral edge of the metallic sheet member from ambient conditions and throughout the regions of the perforations such that the first and second films, respectively, are drawn firmly into engagement with the metallic sheet member by reason of the differential coefficient of thermal expansion between the metallic sheet member and the hydrophobic film material.

A further object of the invention is to provide such an article and such a method wherein the metallic sheet member comprises nickel and the plastic hydrophobic film comprises polytetrafluoroethylene.

Still another object of the invention to provide an improved bipolar cell for gas depolarized rechargeable batteries such as nickel hydrogen and zinc oxygen wherein the bipolar plate is constructed in accordance with the foregoing.

Yet another object of the invention is to provide a bipolar electrode structure based on a conductive cup with insulated hydrophobic conical side walls, as described above, which act to insulate the cell from adjacent cells and impede the exchange of electrolyte solution between cells.

Yet a further object of the invention is to provide such a bipolar battery with conical or cup-shaped electrodes assembled in a nested fashion.

Yet a further object of the invention is to provide such a battery construction with a bipolar cup structure wherein the metallic cup is preferably nickel although titanium may be used, and the insulator is, for example, a hydrophobic insulator such as Teflon®.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 6 is an elevation view, in section, illustrating an early stage of the technique of the invention;

FIG. 7 is an elevation view, in section, similar to FIG. 6, but illustrating a late stage of the technique of the invention; and FIG. 8 is an elevation view, in section, illustrating a resulting sandwich structure according to the invention which is impervious to electrochemical delamination.

DETAILED DESCRIPTION OF THE PREFERRED EMBODIMENT

Figure 1:
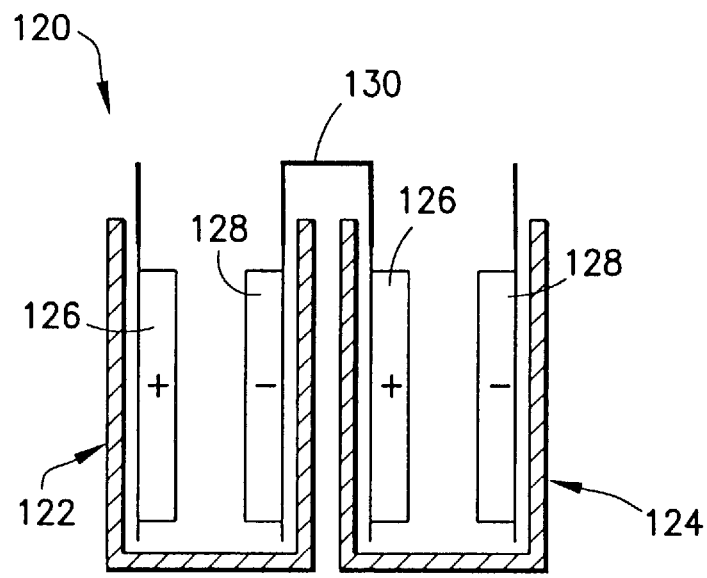
FIG. 1 is an elevational view, partly in section, of a known monopolar battery.
Figure 2:
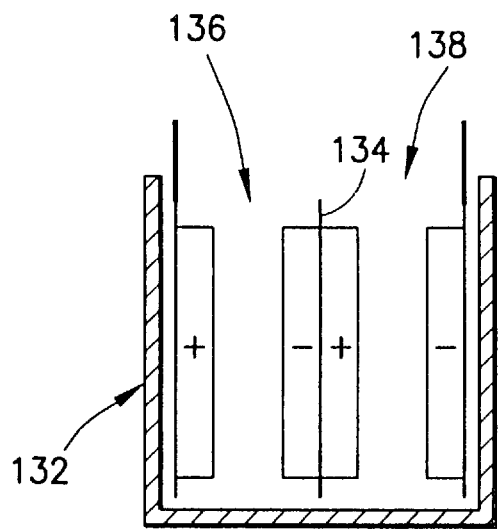
FIG. 2 is an elevational view, partly in section, of a known bipolar battery.

Turn now to the drawings and, initially, to FIG. 1 which illustrates a conventional monopolar battery 120 with adjoining cells 122, 124, each with a positive electrode 126 and a negative electrode 128. In the customary manner, an external bus bar 130 connects the negative electrode 128 of the cell 122 and the positive electrode 126 of the cell 124. In a conventional bipolar battery 132 illustrated in FIG. 2, a conductive planar layer 134 replaces the bus bar 130 and is positioned between adjoining cells 136, 138 and is so constructed in the manner taught in the aforementioned application, Ser. No. 08/626,992 to contain liquid electrolyte solution within the confines of each individual cell. The present invention is an improvement on the construction of that earlier construction of battery.

Figure 3:
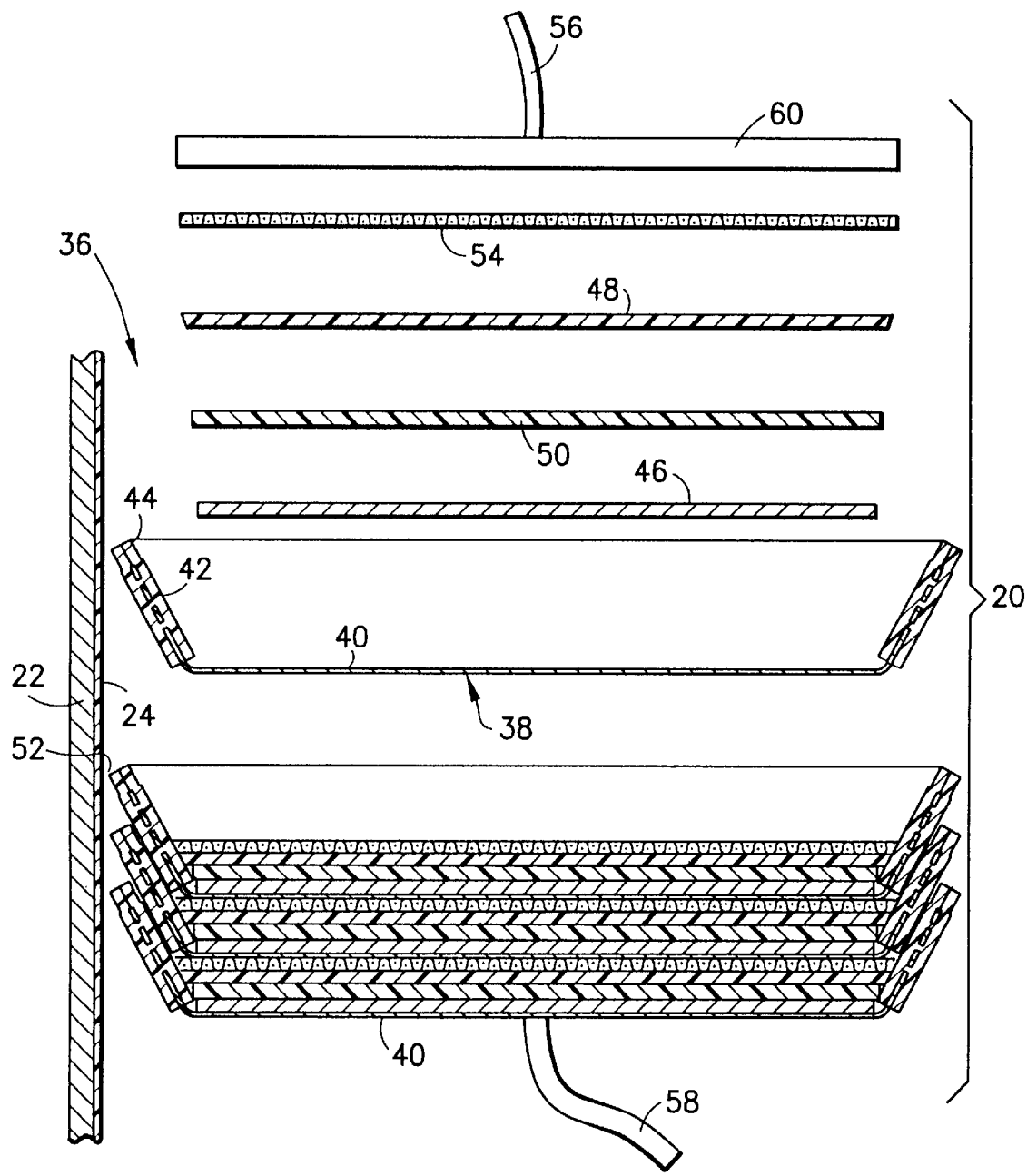
FIG. 3 is a diagrammatic cross section view, partially exploded, illustrating the construction of a plurality of bipolar cells of improved construction which may be utilized in the battery of FIG. 2 and which may embody the present invention.

FIG. 3 illustrates a bipolar rechargeable battery 20 embodying the invention disclosed in the aforementioned application, likely of the bipolar nickel hydrogen variety. A vessel for the battery is defined by a central cylinder 22 which may be coated with a Teflon® liner 24.

Figure 4:
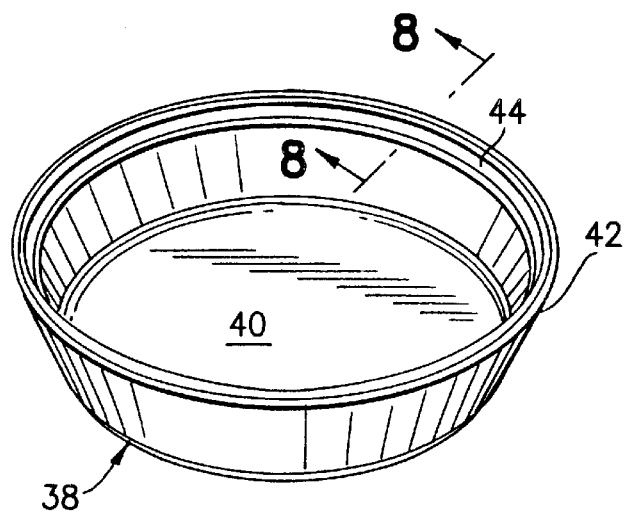
FIG. 4 is a detail perspective view illustrating the construction of a metallic bipolar cup produced using the technique of the invention.
Figure 5:
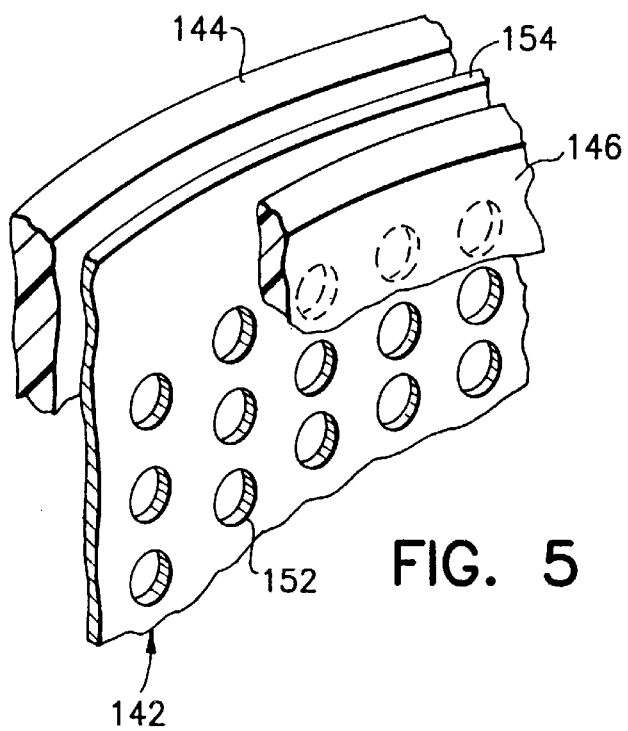
FIG. 5 is a detail perspective view illustrating the construction of any article produced using the technique of the invention.

In FIG. 3, a plurality of cells 36 are suitably mounted within the central cylinder 22 in a nested relationship. Each cell 36 contains a metered predetermined quantity of electrolyte and includes a metallic bipolar cup 38 having a base 40 and an integral upstanding side wall 42 encompassing the base. Preferably the upstanding side wall is of truncated conical shape diverging with increased distance from the base (see FIG. 4), although other shapes are within the scope of the present invention including the side wall 42 being substantially coplanar with the base 40. An insulating material 44 covers the upstanding side wall 42.

The metallic bipolar cup 38 may be fabricated from a variety of materials including nickel, aluminum plated with nickel, stainless steel, metallic coated graphite composite and titanium. A preferred side wall coating is a hydrophobic fluorocarbon such as polytetrafluoroethylene, most notably, that material sold under the trademark Teflon® by E.I. duPont de Nemours Company of Wilmington, Del.

A condensed phase electrode 46 is positioned proximate the base. The condensed phase electrodes typically used for the purposes of the present invention are typically 84% porous 0.1 cm thick sintered nickel supported on a nickel screen and electrochemically loaded to between 1.0 and 2.5 g/cm$^3$ of void volume with active Ni(OH)$_2$. This is a standard aerospace positive electrode although it is understood that a variety of nickel positive electrodes could be employed. In particular a sintered nickel electrode without a support screen would be preferred as the screen is not needed for current conduction in a bipolar battery.

Overlying the condensed phase electrode 46 is a gas electrode 48 including a condensed current collector for a gaseous active material. The gas electrode is typically platinum powder or platinized carbon powder bonded with Teflon® and supported on carbon cloth or expanded metal. The gas electrode must be conductive through its thickness and, to this end, has no hydrophobic wet proofing porous Teflon® layer. Back side hydrophobicity is still required in order that the electrolyte not flood and block a gas screen 54, to be described. This is achieved by the vendor of the gas electrode 48 using a proprietary hydrophobic carbon coating on the gas side of the electrode. It will be appreciated that the gas electrode 48 is a solid current collector for a gaseous active material and is sized to fittingly engage the side wall 42 such that any gas generated at the condensed phase electrode 46 must pass through the gas electrode to escape the cell 36 to thereby recombine the generated gas with the active material gas within the cell.

Intermediate the gas electrode 48 and the condensed phase electrode 46 is a dielectric separator 50. One form of the separator employed for purposes of the invention is ZrO$_2$ woven cloth approximately 80% porous and 0.05 cm thick. However, other suitable materials could be used to achieve a similar result. The separator acts to electrically insulate the opposing electrodes but allows ionic conduction between the electrodes via the liquid electrolyte which fills the pores of the separator.

The upstanding side walls 42 of adjacent cells 36 are oriented such that they mutually define a gap 52 enabling gas communication between the adjacent cells and between each of the cells and the interior bulk gas region 34 within the battery 20. As previously noted, an insulating liner 24 is provided on the inner surface of the vessel for assuring its fluid integrity.

Rounding out the construction of the cell 36 is a gas screen 54 of porous conductive inert material proximate the gas electrode for providing an interface between one cell and an adjoining cell in the battery 20. The gas screen 54 may be any porous conductive inert material such as nickel screen, porous nickel felt, nickel coated plastic screen, and the like. It serves the purpose of allowing shared $H_2$ access to the entire face of the gas electrode and provides electrical conductivity between adjacent cells.

The present invention has particular application in the manufacture of the bipolar cup 38 and, more specifically, of the upstanding wall 40 thereof. Still more specifically, the invention relates to the manner of bonding an inert plastic hydrophobic film material represented by first and second films 144, 146 to opposed surfaces 148, 150 of a metallic sheet member 142. The plastic hydrophobic films 144, 146 are of a hydrophobic fluorocarbon such as polytetrafluoroethylene, most notably, that material sold under the trademark Teflon® by E.I. duPont de Nemours Company of Wilmington, Del. The metallic sheet member 142 may be of any suitable metal but if for use in a bipolar rechargeable battery, nickel would be preferred. In keeping with the invention, the metallic sheet member 142 is formed with a plurality of perforations 152 through the metallic sheet member at locations spaced from a peripheral edge 154 thereof.

Viewing especially FIG. 6, the first film 144 is positioned contiguous with the first surface 148 of the metallic sheet member 142 such that a first border portion 156 extends beyond the peripheral edge 154 of the metallic sheet member. Then, in similar fashion, the second film 146 is positioned contiguous with the second surface 150 of the metallic sheet member 142 such that a second border portion 158 extends beyond the peripheral edge 154 of the metallic sheet member contiguous with the first border portion.

Thereupon, opposed dies 160, 162 which are suitably formed are advanced, respectively, in the directions of arrows 164, 166 and compressed onto a resulting sandwich structure of the metallic sheet member 142 and the first and second films 144, 146 of the plastic hydrophobic material. Even as this occurs, the temperature of the resulting sandwich structure is raised to the sintering temperature of the plastic hydrophobic material until the first and second films 144, 146 are caused to melt sufficiently at their interfaces to cause an intermixing of the juxtaposed material thereof throughout the region of the border portions 156, 158 and throughout the regions of the perforations 152. The sintering temperature is typically less than 400° C. and much less than the melting point of the metallic sheet member which, for nickel, would be $1455^c$.

Thereafter, the resulting sandwich structure is cooled to room temperature at which the first and second films 144, 146 return to a hardened state such that in the region of the border portions 156, 158 are firmly bonded together to form an integral fringe 168 which seals the peripheral edge 154 of the metallic sheet member 142 from ambient conditions. Additionally, throughout the regions of the perforations 152, the first and second films 144, 146 are firmly bonded together such that the first and second films, respectively, are drawn firmly into engagement with the metallic sheet member by reason of the differential coefficient of thermal expansion between the metallic sheet member and the plastic hydrophobic material.

Viewing FIG. 8, the resulting sandwich structure is impervious to electrochemical delamination.

EXAMPLE

As mentioned, in known batteries, a chemically bonded Teflon® layer is usually found to be delaminated during post test examination. Such delamination is never found on batteries built with the above approach. For example, battery BPNH50, a 4 cell 5" diameter battery was assembled with $Ni(OH)_2$ electrodes, $ZrO_2$ felt separators, PT catalyzed negative electrode, carbon cloth gas screens and a 38% KOH, 1.5% LiOH in water electrolyte solution. The bipolar plates for this battery are composed of 0.001" thick nickel metallic cups with three rows of 0.05" diameter perforations on 0.100" centers etched in the side walls of the nickel disk. 0.005" thick Teflon® films are welded to the inner and outer conical surfaces as described in this disclosure. The resultant battery has operated through 18 cycles without any evidence of intercell electrolyte leakage.

While a preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. A bipolar rechargeable battery comprising:
    a vessel having an inner surface defining an interior region for bulk gas storage;
    a plurality of cells mounted within said vessel in a nested relationship, each cell containing a metered predetermined quantity of electrolyte, each of said cells including:
    a metallic bipolar cup having a base and an integral upstanding side wall encompassing said base, said upstanding sidewall having first and second opposed surfaces and a peripheral edge and a plurality of perforations therethrough at locations spaced from said peripheral edge;
    an insulating material covering said upstanding side wall including a first film of plastic hydrophobic material contiguous with said first surface thereof of and extending beyond said peripheral edge of said upstanding sidewall to form a first border portion and including a second film of plastic hydrophobic material contiguous with said second surface of said metallic sheet member and extending beyond said peripheral edge of said upstanding sidewall to form a second border portion contiguous with said first border portion, said first and second films being bonded together under heat and pressure at said first and second border portions to form a solid fringe sealing said edge from ambient conditions, said first and second films being firmly bonded together throughout the regions of the perforations such that said first and second films, respectively, are drawn firmly into engagement with said side wall by reason of the differential coefficient of thermal expansion between said side wall and said plastic hydrophobic material;
    a condensed phase electrode proximate said base;
    a gas electrode including a condensed current collector for a gaseous active material; and
    a dielectric separator between said condensed phase electrode and said gas electrode;

said upstanding side wall of said plurality of cells being oriented to enable gas passage from each of said cells to the bulk gas region within the battery.

2. A bipolar rechargeable battery as set forth in claim 1
wherein each of said upstanding side walls is of truncated conical shape diverging with increased distance from said base;
whereby said upstanding side walls of adjacent ones of said cells mutually define a gap enabling gas communication between said adjacent cells and between each of said cells and the interior region of said vessel.

3. A bipolar rechargeable battery as set forth in claim 2 including:
a gas screen of porous conductive inert material proximate said gas electrode for providing an interface between said cell and an adjoining cell in the battery and for providing gas access to said gas electrode.

4. A bipolar rechargeable battery as set forth in claim 1
wherein said insulating material covering said upstanding side wall is hydrophobic.

5. A bipolar rechargeable battery as set forth in claim 1
wherein said battery is a nickel hydrogen battery; and
wherein said vessel is a pressure vessel.

6. A bipolar rechargeable battery as set forth in claim 1
wherein said gas electrode is a solid current collector for a gaseous active material and is sized to fittingly engage said side wall such that any gas generated at said condensed phase electrode must pass through said gas electrode to escape said cell to thereby recombine the generated gas with the active material gas within said cell.

7. A bipolar rechargeable battery as set forth in claim 1
wherein said metallic bipolar cup comprises nickel and said plastic hydrophobic film comprises polytetrafluoroethylene.

8. In a bipolar rechargeable battery, the combination of:
a metallic bipolar cup having a base and an integral upstanding side wall encompassing said base, said upstanding sidewall having first and second opposed surfaces and a peripheral edge and a plurality of perforations therethrough at locations spaced from said peripheral edge; and
an insulating material covering said upstanding side wall including a first film of plastic hydrophobic material contiguous with said first surface thereof of and extending beyond said peripheral edge of said upstanding sidewall to form a first border portion and including a second film of plastic hydrophobic material contiguous with said second surface of said metallic sheet member and extending beyond said peripheral edge of said upstanding sidewall to form a second border portion contiguous with said first border portion, said first and second films being bonded together under heat and pressure at said first and second border portions to form a solid fringe sealing said edge from ambient conditions, said first and second films being firmly bonded together throughout the regions of the perforations such that said first and second films, respectively, are drawn firmly into engagement with said side wall by reason of the differential coefficient of thermal expansion between said side wall and said plastic hydrophobic material.

9. A bipolar rechargeable battery as set forth in claim 8
wherein said metallic bipolar cup comprises nickel and said plastic hydrophobic film comprises polytetrafluoroethylene.

* * * * *